United States Patent [19]

Schihl

[11] Patent Number: 4,592,531

[45] Date of Patent: Jun. 3, 1986

[54] LINEAR SWITCH POSITIONING DEVICE

[75] Inventor: Raymond J. Schihl, Dryden, Mich.

[73] Assignee: Melvin-AHD, Flint, Mich.

[21] Appl. No.: 727,879

[22] Filed: Apr. 26, 1985

[51] Int. Cl.[4] .............................................. F16M 1/00

[52] U.S. Cl. .................................... 248/646; 248/412

[58] Field of Search ........................ 248/646, 412, 298; 74/531; 308/3 A; 188/67

[56] References Cited

U.S. PATENT DOCUMENTS

| | | | |
|---|---|---|---|
| 2,185,630 | 1/1940 | Fridlund | 308/3 A |
| 3,897,982 | 8/1975 | Teramachi | 308/3 A |
| 3,955,788 | 5/1976 | Delage | 248/298 X |

*Primary Examiner*—Ramon S. Britts
*Assistant Examiner*—Sarah A. Lechok Eley
*Attorney, Agent, or Firm*—Irvin L. Groh

[57] ABSTRACT

This invention relates to linear positioning means and more particularly to a movable carriage and rod assembly for positioning switch elements such as limit switches relative to their actuating means. The primary purpose of this invention is to provide a switch positioning means which can be adjusted to a resolution commensurate with the need and precision of the switching device itself and to provide a positive locking device for the switch carrier which is immune to environmental difficulties such as vibrations and the like and will withstand the deleterious effects of repeated use.

6 Claims, 5 Drawing Figures

Fig-1
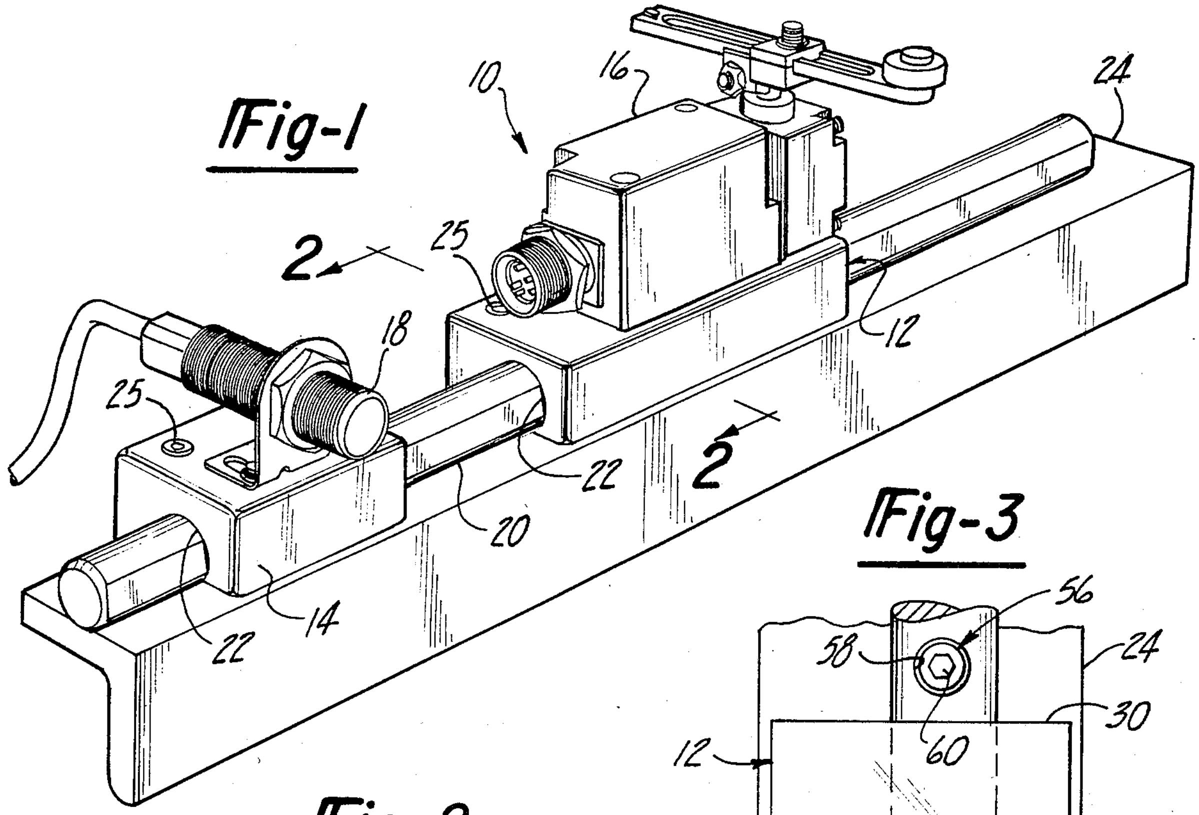
Fig-2
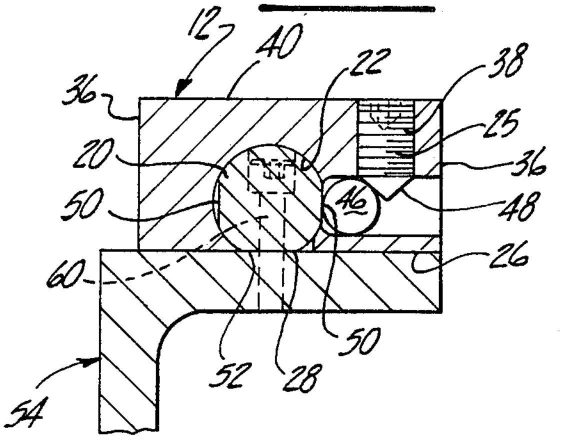
Fig-3
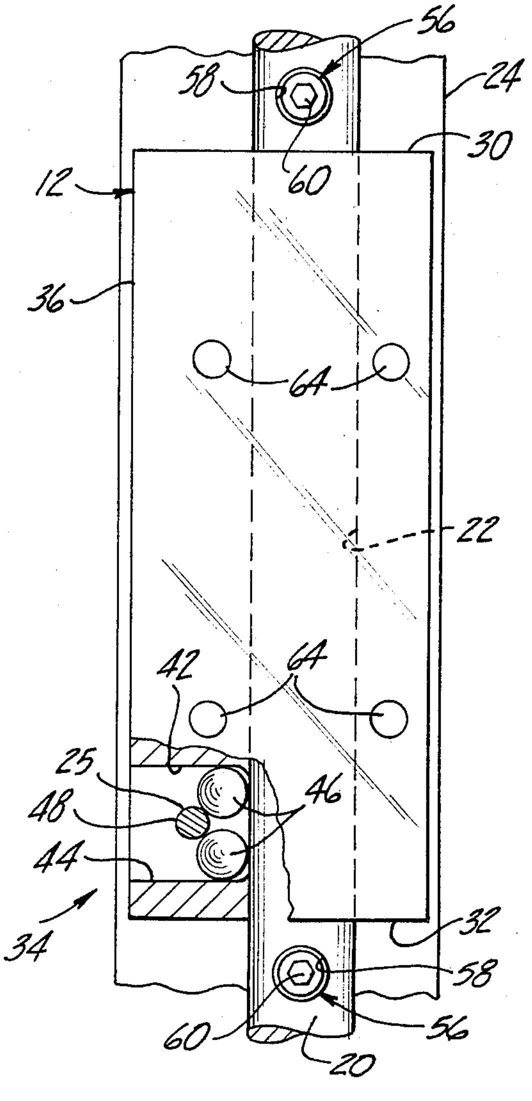
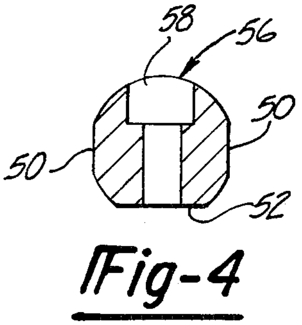
Fig-4
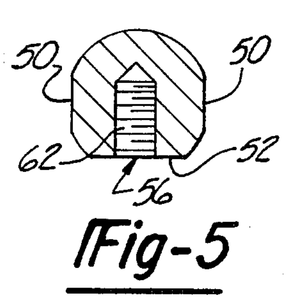
Fig-5

LINEAR SWITCH POSITIONING DEVICE

This invention relates to linear positioning means and more particularly to a movable carriage and rod assembly for positioning switch elements such as limit switches relative to their actuating means.

Limit switches in the form, for example, of micro-switches, proximity switches and the like have been known and highly developed so that they can be actuated with a great degree of precision. Positioning of these switch devices relative to the machine tool, assembly line, conveyor or similar work processing machine, frequently requires adjustable mounting. Here, the practice is usually to mount such a precision device with a set screw or bolt, and, after repeated adjustments, there is wear of the mating surfaces and adjustment become difficult. Moreover, vibrations and loads tend to cause a set screw to back off and the position of the limit switch to be altered.

It is, therefore, the primary purpose of this invention to provide a switch positioning means which can be adjusted to a resolution commensurate with the need and precision of the switching device itself.

It is an object to provide a positive locking device for the switch carrier which is immune to environmental difficulties such as vibrations and the like and will withstand the deleterious effects associated with repeated use.

The foregoing objectives ar accomplished in a simple but precision positioning device by a two point distribution of a moderate tightening force into a locking engagement.

In its basic embodiment, this invention provides a switch carrier in the form of a rectangular carriage block which can be moved along an elongated rod of suitable shape and length to cover the desired space of adjustable positioning. The rectangular carriage block has a bore extending through it from end to end to accommodate the rod. While a square, rectangular, triangular or other shaped rod may be used with a correspondingly shaped bore, economics dictate the use of a round rod and bore in most instances. In the preferred embodiment the bore intersects the bottom of the carriage block forming an elongated slot along the entire length of the carriage block. The rod has a chordal flat so that when it is inserted in the block bore the flat on the rod is flush with the bottom of the carriage block for mounting the rod onto a suitable bracket or mounting plate.

The rod has a number of apertures extending into it from the chordal flat surface for performing the mounting. These apertures can be in the form of blind holes which are tapped to receive a machine screw through the mounting plate and into the body of the rod, or they may be drilled through with a countersink to accept a socket head screw from the top of the rod into the mounting plate or bracket.

A slot is milled into the side of the carriage block intermediate the ends of the block, normally adjacent one end to permit a maximum mounting area for the switching device. The slot extends inward and intersects the bore at a mid position in its height. A threaded aperture extends through the top of the block intersecting the slot midway between the sides of the slot. A pair of balls are located within the slot between the threaded aperture and the rod. The balls have a diameter slightly less than the height of the slot to maintain rolling contact within the slot. An allen head set screw with a conical end is screwed into the threaded aperture to engage the balls and wedge them between the rod and the opposite sides of the slot, to thus lock the carriage in a predetermined position.

In the preferred embodiment the round rod is formed with opposed parallel chordal flats which are perpendicular to the chordal flat on the bottom of the rod so that when the rod is inserted in the bore of the carriage block in its mounted position, one of the two flats will oppose the slot in the area where the two balls engage the rod.

The carriage block has means for mounting the limit switch or other switching device, usually in the form of spaced threaded holes.

In use, the guide rod is mounted to the mounting plate or bracket on which it will be used by screws extending into the rod mounting apertures. The carriage block with the limit switch attached is slid over the guide rod and located in the desired position. The allen head set screw is firmly tightened to wedge the balls against the side of the slot and a chordal flat on the rod to lock the carriage in the predetermined position.

The preferred embodiment of the invention is illustrated in the drawing in which:

FIG. 1 is a perspective view showing the linear switch positioning device of the invention embodied in two separate carriage blocks, each having a switch device and being mounted on a common elongated guide rod attached to a mounting plate;

FIG. 2 is an elevational view in cross section showing the carriage block locked to the guide rod;

FIG. 3 is a plan view showing the movable carriage and rod assembly of the invention;

FIG. 4 is a sectional view of the rod showing one form of mounting hole.;

FIG. 5 is a sectional view of the rod similar to FIG. 4 showing another embodiment of the mounting hole.

Referring to FIG. 1, linear switch positioning device 10 is shown with separate movable carriages 12 and 14 having two commonly used switching devices attached thereto, a micro-switch limit switch 16 and a proximity switch 18, respectively. A movable carriage and rod assembly would include at least one movable carriage and a guide rod 20 along which the carriage can be moved to a predetermined position. Each movable carriage 12 and 14 is in the form of a generally rectangular carriage block having the bore 22 mounting the guide rod 20. The carriage blocks are locked in their predetermined position by tightening of flush mounted allen head set screws 25. Guide rod 20 is attached to mounting plate 24 by screws (not shown) extending through the bottom of mounting plate 24 into guide rod 20 as will be more fully explained.

Bore 22 extending through the rectangular carriage block 12 is normally circular to accommodate a round guide rod 20. Bore 22 is caused to intersect the bottom 26 of block 12 forming an elongated slot 28 extending the length of the block 12 between its ends 30 and 32. Slot 28 may be finished milled to a width less than the diameter of bore 22 as shown in FIG. 2. A rectangular slot 34 is milled into one of the sides 36 of block 12 at a point intermediate the ends 30 and 32 of the block, and usually closer to one end, as shown in FIG. 3. Slot 34 intersects bore 22 at its mid position as shown in FIG. 2. A threaded aperture 38 extends into block 12 from the top 40 intersecting rectangular slot 34 midway between the sides 42 and 44 of the slot spaced from bore 22. Two hardened steel balls 46 having a diameter slightly less than the height of rectangular slot 34 are located in slot 34 between threaded aperture 38 and guide rod 20 inserted in bore 22. Allen head set screw 25 has a conical end 48 and is inserted into threaded aperture 38. When set screw 25 is tightened its conical end 48 will force hardened steel balls 46 apart wedging them between guide rod 20 and slot sides 42 and 44 to lock said carriage block in a predetermined position on guide rod 20. A minimum tightening force is required to provide an adequate wedged lock. In some instances, balls 46 may be made from a hard plastic material instead of hardened steel.

Round guide rod 20 is preferably formed with a pair of opposed parallel chordal flats 50 so that when it is inserted into bore 22, balls 46 will wedge and lock against one of these two chordal surfaces 50. Guide rod 20 is also formed with a third chordal flat surface 52 perpendicular to the parallel chordal flats 50 so that it is flush with bottom 26 of rectangular carriage block 12 for attachment to mounting plate 24 or mounting bracket 54 as shown in FIG. 2.

To facilitate the attachment of guide rod 20 to a mounting surface, it is provided with a plurality of equally spaced apertures 56. As shown in FIG. 4, aperture 56 can take the form of a countersunk hole 58 to accept a socket screw 60 as shown in FIGS. 2 and 3. Aperture 56 can also take the form of a blind threaded hole 62 as shown in FIG. 5. for attachment to a mounting bracket by a screw passing through the bracket and into the guide rod 20.

Movable carriage block 12 is provided with a plurality of mounting holes 64, usually threaded, for mounting the switching device on the block.

The embodiments of the invention in which an exclusive property or privilege is claimed are defined as follows:

1. For use as a linear switch positioning device, a movabl carriage and rod assembly comprising, in combination: an elongated guide rod; a generally rectangular carriage block having: a bore through which said rod extends from the ends thereof for movement of said carriage block along said rod to a predetermined position; a slot having sides extending inward from a side of said block intermediate the ends of said block, said slot intersecting said bore at a mid position thereof; a threaded aperture extending through the top of said block intersecting said slot midway between the sides of said slot; means for attaching said switch thereto; a pair of balls within said slot between said threaded aperture and said rod; and a screw extending into said threaded aperture with a conical end for engaging said balls and wedging them between said rod and the opposite sides of said slot to lock said carriage block in said predetermined position on said guide rod.

2. The linear switch positioning device according to claim 1 wherein said guide rod is an initially round bar having opposed parallel chordal flats formed thereon and is positioned in said carriage block so that said balls seat against one of said flats as they are wedged in locking relationship by said screw.

3. The linear switch positioning device according to claim 2 wherein said bore intersects the bottom of said carriage block forming an elongated slot the entire length of said carriage block, and said rod has a third chordal flat, perpendicular to said parallel chordal flats and flush with the bottom of said carriage block.

4. The linear switch positioning device according to claim 3 wherein said rod has a plurality of apertures extending therein from said third chordal flat for mounting said rod and hence said carriage and rod assembly to a mounting bracket by threaded fasteners extending into said rod apertures.

5. The linear switch positioning device according to claim 5 wnerein said rod apertures are threaded to receive said threaded fasteners.

6. The linear switch positioning device according to claim 4 wherein said plurality of apertures extend through said rod having an enlarged countersunk portion opposite said third chordal flat to receive socket head screws for attachment to said mounting bracket.

* * * * *